United States Patent
Kogler

(10) Patent No.: US 9,776,618 B2
(45) Date of Patent: Oct. 3, 2017

(54) MOTOR VEHICLE AND METHOD

(71) Applicant: Webasto SE, Stockdorf (DE)

(72) Inventor: Rupert Kogler, Wörthsee (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 14/428,709

(22) PCT Filed: Aug. 8, 2013

(86) PCT No.: PCT/EP2013/066654
§ 371 (c)(1),
(2) Date: Mar. 17, 2015

(87) PCT Pub. No.: WO2014/044464
PCT Pub. Date: Mar. 27, 2014

(65) Prior Publication Data
US 2015/0224982 A1    Aug. 13, 2015

(30) Foreign Application Priority Data

Sep. 20, 2012   (DE) .................. 10 2012 108 875

(51) Int. Cl.
*B60W 20/00*      (2016.01)
*B60K 16/00*      (2006.01)
(Continued)

(52) U.S. Cl.
CPC .......... *B60W 20/106* (2013.01); *B60K 16/00* (2013.01); *B60L 1/003* (2013.01); *B60L 8/003* (2013.01);
(Continued)

(58) Field of Classification Search
CPC .... B60W 20/106; B60W 20/13; B60W 10/06; B60W 10/26; B60W 2510/244;
(Continued)

(56) References Cited

U.S. PATENT DOCUMENTS 6,252,382 B1    6/2001   Ganz et al.
8,069,940 B2   12/2011   Nenno et al.
(Continued)

FOREIGN PATENT DOCUMENTS

CN   102640380 A    8/2012
DE   198 17 057 A1  10/1999
(Continued)

OTHER PUBLICATIONS

International Search Report dated May 28, 2014, issued in International Application PCT/EP2013/066654.

*Primary Examiner* — Mussa A Shaawat
*Assistant Examiner* — Michael Kerrigan
(74) *Attorney, Agent, or Firm* — Fitch, Even, Tabin & Flannery, LLP

(57) ABSTRACT

A motor vehicle comprises an assembly for charging an energy store, which assembly has: an element for converting radiation energy into electrical energy, a further element for providing electrical energy, the energy store, a control device which is coupled to the conversion element, to the further element and to the energy store, in order to control the charging of the energy store by the conversion element and the further element, as a function of prediction data which comprises weather data, and as a function of a predefined value of the state of charge of the energy store.

21 Claims, 1 Drawing Sheet

(51) Int. Cl.
    *B60L 1/00*     (2006.01)
    *B60L 8/00*     (2006.01)
    *B60L 11/18*     (2006.01)
    *H02J 7/14*     (2006.01)
    *B60W 10/06*     (2006.01)
    *B60W 10/26*     (2006.01)
    *B60W 20/13*     (2016.01)

(52) U.S. Cl.
CPC ....... *B60L 11/1801* (2013.01); *B60L 11/1809* (2013.01); *B60W 10/06* (2013.01); *B60W 10/26* (2013.01); *B60W 20/13* (2016.01); *H02J 7/1415* (2013.01); *B60K 2016/003* (2013.01); *B60L 2240/665* (2013.01); *B60L 2260/50* (2013.01); *B60W 2510/244* (2013.01); *B60W 2550/12* (2013.01); *B60W 2710/244* (2013.01); *Y02T 10/7005* (2013.01); *Y02T 10/7072* (2013.01); *Y02T 10/7083* (2013.01); *Y02T 10/7291* (2013.01); *Y02T 10/84* (2013.01); *Y02T 10/90* (2013.01); *Y02T 90/14* (2013.01); *Y02T 90/16* (2013.01); *Y10S 903/907* (2013.01); *Y10S 903/93* (2013.01)

(58) Field of Classification Search
CPC ......... B60W 2550/12; B60W 2710/244; H02J 7/1415; B60L 1/003; B60L 11/1801; B60L 8/003; B60L 11/1809; B60L 2260/50; B60L 2240/665; B60K 16/00; B60K 2016/003; Y02T 10/7072; Y02T 10/7291; Y02T 90/14; Y02T 10/7083; Y02T 10/90; Y02T 10/7005; Y02T 90/16; Y02T 10/84; Y10S 903/93; Y10S 903/907

See application file for complete search history.

(56) References Cited

U.S. PATENT DOCUMENTS

| | | | |
|---|---|---|---|
| 8,473,131 | B2 | 6/2013 | Leary |
| 8,718,856 | B2 | 5/2014 | Leary |
| 2005/0063121 | A1 | 3/2005 | Jordan |
| 2006/0287775 | A1 | 12/2006 | Bechtold et al. |

FOREIGN PATENT DOCUMENTS

| | | |
|---|---|---|
| DE | 10 2009 044 161 A1 | 4/2010 |
| EP | 1 663 719 A1 | 6/2006 |
| GB | 2 417 378 A | 2/2006 |
| GB | 2471331 A | 12/2010 |
| JP | 2007-022211 A | 2/2007 |
| WO | 2011038056 A1 | 3/2011 |

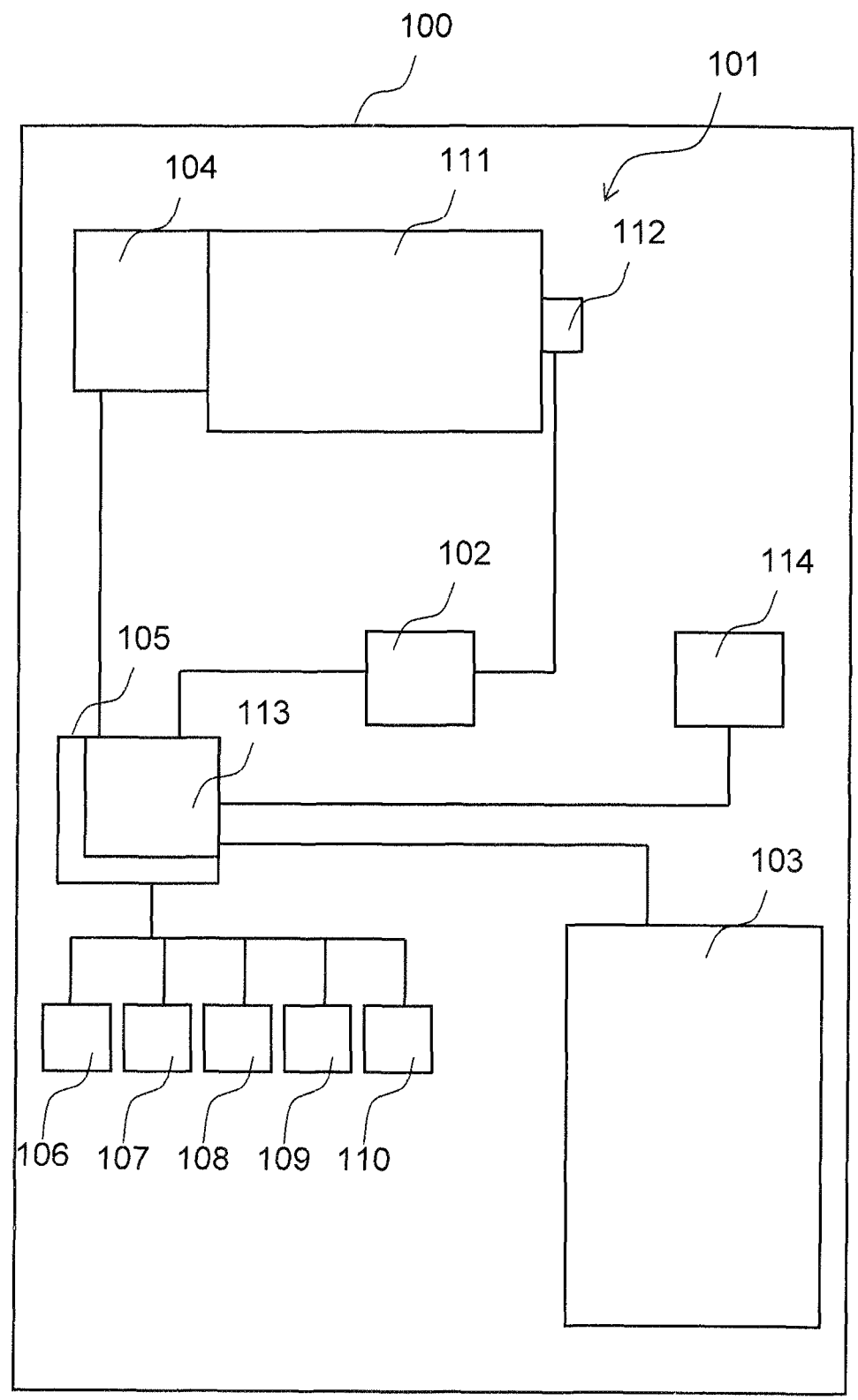

MOTOR VEHICLE AND METHOD

CROSS REFERENCE TO RELATED APPLICATIONS

This application is a U.S. national phase application filed under 35 U.S.C. §371 of International Application No. PCT/EP2013/066654, filed Aug. 8, 2013, designating the United States, which claims priority from German Patent Application No. 10 2012 108 875.6 filed Sep. 20, 2012, which are hereby incorporated herein by reference in their entirety for all purposes.

The invention relates to a motor vehicle having an assembly for charging an energy store, and to a method for charging an energy store of a motor vehicle.

The consumers which are connected to the on-board power system of a motor vehicle are conventionally supplied with electric current by means of the internal combustion engine of the motor vehicle via a dynamo and a battery which is connected downstream of this dynamo. In addition, photovoltaic modules can be provided in order to charge the battery.

It is desirable to specify a motor vehicle having an assembly for charging an energy store in which reliable charging of the energy store is possible. Furthermore, it is desirable to specify a reliable method for charging an energy store of a motor vehicle.

According to one embodiment of the invention, a motor vehicle comprises an assembly for charging an energy store. The assembly has an element for converting radiation energy into electrical energy. The assembly has a further element for providing electrical energy. The assembly also comprises the energy store and a control device. The control device is coupled to the conversion element, to the further element and to the energy store, in order to control the charging of the energy store by the conversion element and the further element, as a function of prediction data which comprises weather data, and as a function of a predefined value of the state of charge of the energy store.

The energy store can be charged by the element for converting radiation energy into electrical energy, and the further element for providing electrical energy. During operation of the motor vehicle, the energy store serves, for example, to supply electric current to a starter of an internal combustion engine for starting the internal combustion engine. The energy store also makes available, for example, electric current for further electric consumers of the motor vehicle, for example an electric air conditioning system.

The control device is configured preferably to charge the energy store by means of the element for converting radiation energy into electrical energy. The control device is configured to determine, as a function of the prediction data, whether the electrical energy which is made available by the conversion element for charging the energy store is sufficient to charge the energy store at least up to the predefined value of the state of charge, in particular within a predefined time period. In particular, the control device is configured to determine whether the energy for charging the energy store which is made available by the conversion element during a parked state of the motor vehicle is sufficient to charge the energy store to such an extent that the energy store provides sufficient electric current to start the internal combustion engine with the starter. The predefined value for the state of charge is, in particular, a value for the state of charge which has to be at least present for the internal combustion engine to be able to be reliably started.

The control device is configured to control the charging of the energy store in such a way that the energy store is charged by the further element for providing electrical energy, if it is determined that the conversion element cannot provide sufficient energy for charging, in order to reach the predefined value of the state of charge of the energy store.

According to embodiments, the further element for providing electrical energy is a generator which is mechanically coupled to an internal combustion engine of the motor vehicle. Such generators are frequently referred to as a dynamo. The charging of the energy store by the generator is carried out, in particular, during a state of use of the motor vehicle in which the internal combustion engine is started.

According to further embodiments, the further element for providing electrical energy comprises an interface with an external electrical power supply. It is possible, for example, to connect the motor vehicle to an external power supply via a cable. The motor vehicle is preferably charged by the element for converting radiation energy into electrical energy, and the energy store is charged by means of the external power supply only if it is detected that the energy which is provided by the conversion element for charging is not sufficient to charge the energy store up to the predefined value of the state of charge.

According to further embodiments, the further element comprises other energy suppliers which are suitable for charging the energy store.

The element for converting radiation energy comprises, according to embodiments, a photovoltaic module. According to further embodiments the conversion element comprises a multiplicity of photovoltaic modules. The photovoltaic modules are configured to convert radiation energy into electrical energy, for example given incident sunlight. The element for converting radiation energy into electrical energy comprises, in particular, a photovoltaic cell or a multiplicity of photovoltaic cells. The photovoltaic cell is, according to one embodiment, an integral component of the motor vehicle. The photovoltaic cell is, for example, integrated into a surface coating of the motor vehicle. In particular, the photovoltaic cells are integrated into a sunroof of the motor vehicle and are, for example, transparent or partially transparent. According to further embodiments, the photovoltaic cell or the photovoltaic module is a component which is separate from the motor vehicle and is mechanically coupled to the motor vehicle. The element for converting radiation energy comprises, according to embodiments, a thermoelectric transducer which is configured, in particular, to convert thermal radiation energy into electrical energy. For example, the conversion element comprises a Peltier element or a plurality of Peltier elements.

According to further embodiments, the assembly comprises at least one interface for receiving the prediction data. The interface is coupled to the control device. The interface is, for example, configured to communicate the location to the control device via a GPS system. The interface is configured, for example, to transfer data about predicted solar radiation to the control device. The interface is configured, for example, to transfer data about a predicted temperature to the interface. Alternatively or additionally, according to further embodiments further interfaces are present which transfer further data to the interface, which data can be used to predict the energy which can be provided by the conversion element in the predefined time period.

According to one embodiment of the invention, a method for charging an energy store of a motor vehicle comprises determining an actual value of the state of charge of the energy store. An estimate of the quantity of energy is determined which is provided at a predefined time period by an element for converting radiation energy into electrical energy in order to charge the energy store. The estimate is carried out as a function of the determined prediction data. The conversion element is mechanically coupled to the motor vehicle. This also includes the case in which the conversion element is an integral component of the motor vehicle. An estimate of a value of the state of charge of the energy store after charging with the estimated quantity of energy is determined. The energy store is charged by means of the conversion element if the estimated state of charge is higher than or equal to a predefined value of the state of charge.

In the method for charging an energy store it is possible to charge the energy store preferably with the conversion element and at the same time reliably ensure a predefined value of the state of charge.

According to embodiments, the energy store is charged by means of a further element for providing electrical energy if the estimated value of the state of charge is lower than the predefined value of the state of charge. It is therefore possible for the state of charge of the energy store to be at least the predefined value of the state of charge even if the estimated quantity of energy is not sufficient to charge the energy store up to the predefined value of the state of charge.

In particular, the energy store is charged by means of a generator which is mechanically coupled to an internal combustion engine of the motor vehicle if the estimated value of the state of charge is lower than the predefined value of the state of charge.

According to further embodiments, the energy store is charged exclusively by means of the conversion element if the estimated value of the state of charge is higher than or equal to the predefined value of the state of charge.

According to embodiments, the prediction data comprises at least one of solar radiation, temperature, standard and determined user profile. The prediction data comprises, according to embodiments, further data which is useful for estimating the quantity of energy which is provided in the predefined time period by the element for converting radiation energy into electrical energy for charging the energy store, in order to permit a reliable prediction.

According to further embodiments, the predefined time period is predefined as a function of a determined user profile.

The determined user profile comprises, according to embodiments, for example a predicted stationary time of the motor vehicle and/or a predicted travel period of the motor vehicle and/or a predicted location during a parked state of the motor vehicle and/or further information which is useful for determining the estimation of the quantity of energy.

By means of the motor vehicle with the assembly and the method for charging it is possible to equip the motor vehicle with just a single energy store which can take up energy both from the element for converting radiation energy into electrical energy and from the further element for providing electrical energy, and provides electrical energy both for starting the internal combustion engine and for further electronic consumers. By means of the control device which is designed to carry out the method it is possible to feed the largest possible quantity of energy of the element for converting radiation energy into electrical energy into the energy store. At the same time it is ensured that the motor vehicle is ready for use in every situation. For example it is ensured that the internal combustion engine can be started by the starter in any situation.

The features and advantages which are specified in conjunction with the motor vehicle and the arrangement are also used in conjunction with the method, and vice versa.

Further advantages, features and developments can be found in the examples described below in conjunction with the FIGURE.

The single FIGURE shows a schematic block diagram of a motor vehicle according to an embodiment.

The FIGURE is a schematic view of a motor vehicle 100. The motor vehicle 100 comprises an assembly 101 for charging an energy store 102. The assembly 101 comprises an element 103 for converting radiation energy into electrical energy. The assembly 101 comprises a further element 104 for providing electrical energy. The assembly 101 has a control device 105. The control device 105 comprises, according to embodiments, a charge controller 113. The assembly 101 comprises the interfaces 106, 107, 108, 109 and 110. According to embodiments, the assembly 101 comprises fewer than five interfaces, in particular four interfaces or fewer, for example one interface or two interfaces. According to further embodiments, the assembly 101 comprises more than five interfaces, for example six interfaces or more.

The motor vehicle 100 comprises, according to the illustrated exemplary embodiment, an internal combustion engine 111 having a starter 112. According to further embodiments, the motor vehicle 100 comprises a fuel cell drive in which, for example, hydrogen is used as the fuel. According to further embodiments, the motor vehicle 100 comprises an electric vehicle which is driven directly by means of electrical energy.

The element 103 for converting radiation energy into electrical energy comprises, in particular, at least one photovoltaic cell. The photovoltaic cell is configured to convert radiation energy, for example given incident sunlight, into electrical energy. According to embodiments, the photovoltaic cell is an organic photovoltaic cell. According to further embodiments, the photovoltaic cell is an inorganic photovoltaic cell.

The element 103 for converting radiation energy into electrical energy is, for example, a photovoltaic module which comprises a multiplicity of the photovoltaic cells. The photovoltaic module is, according to embodiments, embodied as a separate component from the motor vehicle and is mechanically coupled to the motor vehicle, for example by means of screws or clamps. According to further embodiments, the photovoltaic cells are an integral component of the motor vehicle and are integrated, for example, into the roof area of the motor vehicle or the engine cover of the motor vehicle. The photovoltaic cells are, for example, components of the surface coating of the motor vehicle. This is possible, in particular, in the case of organic photovoltaic cells.

The further element 104 for providing energy comprises, according to embodiments, a mechanical generator which is mechanically coupled to the internal combustion engine 111 of the motor vehicle. The generator 104 can be driven by the internal combustion engine 111. In embodiments of the motor vehicle without an internal combustion engine, for example in the case of electric vehicles, the further element 104 comprises other energy suppliers which are suitable for charging the energy store 102, in particular an interface with an external power supply.

The internal combustion engine 111 is configured to drive the motor vehicle 100. The starter 112 is configured to start the internal combustion engine 111. The starter 112 comprises, in particular, an electric motor.

The energy store 102 is, according to embodiments, an accumulator. In particular, the motor vehicle comprises just a single accumulator which is both electrically coupled to the starter 112 and also serves as an energy store for the electrical energy which is provided by the element 103. According to further embodiments, the motor vehicle comprises more than one accumulator, but an additional accumulator for storing the energy from the conversion element 103 is not provided. The energy from the element 103 is stored in an accumulator which would also be provided in the motor vehicle if the conversion element 103 were not provided, for example in accumulators of a hybrid drive.

The starter 112 is electrically coupled to the energy store 102. According to embodiments, further electronic consumers 114 of the motor vehicle 100 are electrically coupled to the energy store 102.

The interface 106 is, for example, an interface with a GPS system for providing location data. The interface 107 is, for example, an interface with an element for determining a temperature. The interface 108 is an interface with an element for providing data about solar radiation. The interface 109 is an interface with an element for determining a user profile. The interface 110 is an interface for determining the time of day and time of year. According to embodiments, the interfaces 106 to 110 are part of the control device 105.

The element 103 and the element 104 are each coupled to the control device 105 or to the charge regulator 113 in such a way that it is possible to charge the energy store 102 by means of the element 103 or the element 104. The control device 105 or the charge regulator 103 is configured to control the charging of the energy store 102 by means of the element 103 and the element 104. The charge regulator 113 is configured to decide, as a function of prediction data, whether the energy store 102 is charged exclusively by the element 103, by the element 104 or by both elements 103 and 104. The charge regulator 113 is configured in such a way that the energy store 102 is preferably charged by the element 103. As a result, the largest possible amount of electrical energy which has been acquired from radiation energy is used to charge the energy store 102, and the smallest possible amount of electrical energy which is provided by the element 104.

A predefined value for the state of charge of the energy store 102 is stored in the control device 105. The predefined value corresponds, for example, to a minimum state of charge for the energy store 102, with the result that the energy store 102 is sufficiently charged in order to start the motor vehicle 100 or the internal combustion engine 111.

The control device 105 determines, as a function of the predefined value for the state of charge and as a function of the prediction data, whether sufficient energy for charging the energy store is provided by the element 103. This data is provided by the control device 105 to the charge regulator 113 which then correspondingly performs closed-loop or open-loop control of the charging of the energy store 102. In order to determine whether the energy which is provided by the element 103 is sufficient to reach at least the predefined value of the state of charge of the energy store 102 in the case of charging by the element 103, the control device 105 provides prediction data. The prediction data makes it possible to estimate the quantity of energy which is provided in a predefined time period by the element 103 for charging the energy store. The prediction data comprises weather data, that is to say in particular temperature data and data about solar radiation, which weather data is provided via the interfaces 107 and 108. The weather data is taken into account as a function of the location which is provided via the interface 106. Furthermore, the weather data is taken into account as a function of the time of day or time of year, which is provided via the interface 110. The estimate of the quantity of energy which is provided by the element 103 is dependent, in particular, on a determined user profile which is provided via the interface 109.

The user profile prescribes, in particular, the predefined time period for which the predicted energy yield of the element 103 is estimated. The predefined time period comprises, for example, a period for which the motor vehicle is parked in an uncovered car park. The user profile is determined on the basis of an actual historical use of the motor vehicle and is regularly adapted to the actual use of the motor vehicle 100. According to embodiments, the user profile is dependent on predefined models relating to the use of the motor vehicle 100.

The further consumers 114 comprise, for example, an electric air conditioning system. The further consumers 114 can be activated during the parked state and supplied with energy by the element 103 and the energy store 102. In this context, the control device 105 controls the operation of the consumers 114 in such a way that at least the predefined value for the state of charge of the energy store 102 is always reached.

For example, the motor vehicle 100 is used regularly on specific days to drive from a residence to a place of work where it is then parked during the day and is used again in the evening for the return journey. This is stored in the user profile, and it is therefore known to the control device 105 that on these days the motor vehicle is expected not to be used during the day and it is possible that there will be solar radiation on the element 103. The predefined time period corresponds in this example to the time period between the switching off of the motor vehicle at the place of work and the start of the home journey from the place of work. The position of the car park is known by means of the location information, and for example the intensity of the solar radiation is therefore known. For example, the usable solar energy is dependent on the latitude. In addition, the location information can be used to verify the user profile. For example, the control device 105 determines the probable temperature profile and, in particular, the probable profile of the solar radiation in the morning before the predicted journey to the place of work for the day for the probable car park predefined by the user, as a function of the time of day and time of year. This data is provided, for example, by means of a service provider and is made available to the control device 105 via the interfaces 107 and 108. It is therefore known to the control device at what location and for how long the motor vehicle will probably be parked and how much solar radiation can be converted in this time by the element 103 in order to charge the energy store 102.

It is therefore possible that the control device 105 can already determine before the start of a journey whether the energy which is made available by the element 103 during the day is sufficient to charge the energy store 102 at least to such an extent that there may still be enough energy available to it after the parking in order to start the engine. If the motor vehicle is parked at the place of work and, on the basis of the user profile, will probably not be used again until the evening for the return journey to the place of residence and again the following morning for the journey to work, sufficient energy for starting the motor vehicle must additionally also be available the next morning in the energy store 102, since charging of the energy store 102 by means of the element 103 is not possible at night.

If the control device 105 determines that the energy which is made available by the element 103 is sufficient to permit the predicted starts of the internal combustion engine 111, in the illustrated example the energy store 102 is not charged by the element 104 even on the journey to the place of work. The energy store is charged exclusively by energy which is converted into electrical energy by the element 103.

If the control device 105 determines that the energy which is probably made available by the element 103 in the predefined time period is not sufficient to permit the probable number of starts of the internal combustion engine 111, the energy store is entirely or partially charged up to the predefined value of the state of charge by means of the element 104 during the travel of the motor vehicle 100. If it is expected that the element 103 will not be able to make available any energy, for example because the motor vehicle is expected to be parked in a parking garage, the energy store 102 is charged completely up to the predefined value of the state of charge by means of the element 104. If electrical energy is made available by the element 103, but the energy is not sufficient to reach the predefined value of the state of charge, the energy store 102 is charged with the difference between the provided energy of the element 103 and the predefined value of the state of charge by means of the element 104.

According to further embodiments, the predefined time period is always the next day, that is to say for example always the time period between 0 and 24 hours. The control device 105 determines, as a function of the user profile and the weather data, how much electrical energy for charging the energy store 102 will be provided by the element 103 on the next day between 0 and 24 hours. As a function of this information, the charging of the energy store 102 is controlled by the control device 105 and the charge regulator 113 in such a way that as much solar energy as possible is used to charge the energy store 102. The charging of the energy store 102 is controlled in such a way that as little energy of the element 104 as possible is required. As a result, low-pollutant and resource-saving charging of the energy store 102 is possible. The charging of the energy store 102 is controlled in such a way that at least the predefined value of the state of charge is always reached, with the result that starting of the internal combustion engine is possible in every situation.

According to further embodiments, the predefined time period is a different time period, for example a week, a month or some other time period in which the motor vehicle is used particularly regularly.

As a result of the fact that according to embodiments only a single or no additional energy store is used, the motor vehicle is cost-efficient and weight-efficient. In addition, the operation of the electric air conditioning system with the energy of the element 103 permits the comfort of the user of the motor vehicle 100 to be improved in a way which is low in pollutants.

The invention claimed is:

1. A motor vehicle having an assembly for charging an energy store, which assembly comprises:
    a combustion engine configured to be operated independently of charging the energy store,
    one element for providing electrical energy to the energy store, the element being a conversion element for converting radiation energy into electrical energy,
    a further element for providing electrical energy to the energy store, the further element being a generator being able to be coupled to the combustion engine,
    the energy store, and
    a control device which is coupled to the conversion element, to the generator and to the energy store, in order to control the charging of the energy store by the conversion element and the generator, as a function of prediction data which comprises weather data, and as a function of a predefined value of the state of charge of the energy store; and
    wherein the prediction data further comprises a user profile determined on a basis of an actual historical use of the motor vehicle and is regularly adapted to an actual use of the motor vehicle, the user profile having at least one of a predicted stationary time of the motor vehicle, and
    wherein the charging of the energy store is performed solely by the conversion element during the predicted stationary time of the motor vehicle if the energy which is made available by the conversion element during the predicted stationary time is determined to be sufficient to start the engine after the predicted stationary time.

2. The motor vehicle according to claim 1, wherein the assembly comprises at least one interface for receiving the prediction data, which interface is coupled to the control device.

3. The motor vehicle according to claim 1, wherein the element for converting radiation energy into electrical energy comprises a photovoltaic module.

4. The motor vehicle according to claim 1, wherein the generator comprises a generator which is mechanically coupled to an internal combustion engine of the motor vehicle.

5. The motor vehicle according to claim 1, wherein the energy store is electrically coupled to a starter of the internal combustion engine, in order to provide electric current for the starter for starting the internal combustion engine.

6. The motor vehicle according to claim 1, wherein the energy store comprises an accumulator.

7. The motor vehicle according to claim 1, wherein the control device is configured to determine the user profile on the basis of actual historical use of the motor vehicle and is regularly adapted to the actual historical use of the motor vehicle.

8. The motor vehicle according to claim 1, wherein the charging of the energy store is not performed by the generator even on a journey outside the predicted stationary time if the energy which is made available by the conversion element during the predicted stationary time is determined to be sufficient to start the engine of the motor vehicle after the predicted stationary time.

9. The motor vehicle according to claim 1, wherein the charging of the energy store during the predicted stationary time of the motor vehicle is performed by the conversion element and by the generator if the energy which is made available by the conversion element during the day is determined to be insufficient to start the engine of the motor vehicle after the predicted stationary time.

10. The motor vehicle according to claim 1, wherein the user profile determined on a basis of an actual historical use of the motor vehicle having at least one of a predicted travel period of the motor vehicle and a predicted location during a parked state of the motor vehicle.

11. A method for charging an energy store of a motor vehicle, comprising:
    determining an actual value of the state of charge of the energy store,
    determining prediction data which comprises weather data, determining an estimate of the quantity of energy which is provided in a predefined time period by one element for providing electrical energy to the energy store, the element being a conversion element for converting radiation energy into electrical energy in order to charge the energy store, wherein the conversion element is mechanically coupled to the motor vehicle, as a function of the prediction data, determining an estimate of a value of the state of charge of the energy store after charging with the estimated quantity of energy, charging the energy store by means of the conversion element if the estimated state of charge is higher than or equal to a predefined value of the state of charge, and wherein the step of determining prediction data further comprises determining a user profile on the basis of an actual historical use of the motor vehicle and regular adaptation to the actual use of the motor vehicle, the user profile having a predicted stationary time of the motor vehicle, wherein the step of determining prediction data further comprises determining before the start of a journey whether the energy which is made available by the conversion element during the day is sufficient to charge the energy store at least to such an extent that there may still be enough energy available to it after the predicted stationary time in order to start an engine of the motor vehicle, and wherein the charging of the energy store is performed solely by the conversion element during the predicted stationary time of the motor vehicle if the energy which is made available by the conversion element during the predicted stationary time is determined to be sufficient to start the engine of the motor vehicle after the predicted stationary time.

12. The method according to claim 11, comprising:
charging the energy store by means of a further element for providing electrical energy, the further element being a generator being able to be coupled to the combustion engine of the motor vehicle in order to charge the energy store, if the estimated value of the state of charge is lower than the predefined value of the state of charge.

13. The method according to claim 11 comprising:
charging the energy store by a generator which is mechanically coupled to an internal combustion engine of the motor vehicle if the estimated value of the state of charge is lower than the predefined value of the state of charge.

14. The method according to claim 11, comprising:
charging the energy store exclusively by means of the conversion element if the estimated value of the state of charge is higher than or equal to the predefined value of the state of charge.

15. The method according to claim 11, wherein the prediction data further comprises at least one of solar radiation, temperature, and location.

16. The method according to claim 11, wherein the predefined time period is predefined as a function of the determined user profile.

17. The method for charging an energy store of a motor vehicle according to claim 11, further comprising determining the user profile on the basis of actual historical use of the motor vehicle and is regularly adapting to the actual historical use of the motor vehicle.

18. The method according to claim 11, wherein the motor vehicle comprises a further element for providing electrical energy to the energy store, the further element being a generator being able to be coupled to the combustion engine of the motor vehicle in order to charge the energy store, and wherein the charging of the energy store is not performed by the generator even on a journey outside the predicted stationary time if the energy which is made available by the conversion element during the predicted stationary time is determined to be sufficient to start the engine of the motor vehicle after the predicted stationary time.

19. The method according to claim 11, wherein the motor vehicle comprises a further element for providing electrical energy to the energy store, the further element being a generator being able to be coupled to the combustion engine of the motor vehicle in order to charge the energy store, and wherein the charging of the energy store during the predicted stationary time of the motor vehicle is performed by the conversion element and by the generator if the energy which is made available by the conversion element during the predicted stationary time is determined to be insufficient to start the engine of the motor vehicle after the predicted stationary time.

20. The method according to claim 11, wherein the step of determining a user profile on the basis of an actual historical use of the motor vehicle and regular adaptation to the actual use of the motor vehicle, the user profile having at least one of a predicted travel period of the motor vehicle and a predicted location during a parked state of the motor vehicle.

21. A method for charging an energy store of a motor vehicle, comprising:
determining an actual value of the state of charge of the energy store,
determining prediction data which comprises weather data,
determining an estimate of the quantity of energy which is provided in a predefined time period by one element for providing electrical energy to the energy store, the element being a conversion element for converting radiation energy into electrical energy in order to charge the energy store, wherein the conversion element is mechanically coupled to the motor vehicle, as a function of the prediction data,
determining an estimate of a value of the state of charge of the energy store after charging with the estimated quantity of energy,
charging the energy store by means of the conversion element if the estimated state of charge is higher than or equal to a predefined value of the state of charge, and
wherein the step of determining prediction data further comprises determining a historical user profile using at least a predicted stationary time of the motor vehicle.

* * * * *